Jan. 1, 1952

P. L. BORN 2,581,071

SHUTOFF VALVE

Filed June 7, 1950

INVENTOR.
Paul L. Born,
BY

Jan. 1, 1952

P. L. BORN 2,581,071

SHUTOFF VALVE

Filed June 7, 1950

INVENTOR.
Paul L. Born,
BY
ATTYS.

Patented Jan. 1, 1952

2,581,071

UNITED STATES PATENT OFFICE 2,581,071

SHUTOFF VALVE

Paul L. Born, Wilmette, Ill.

Application June 7, 1950, Serial No. 166,709

16 Claims. (Cl. 50—5)

My present invention relates primarily to a combined automatic high and low pressure safety shut off valve and gas regulator.

Gas distribution systems may be thought of as pipes leading from a supply point to points of consumption carrying gas under a pressure adequate to give the consumer, farthest from the supply point, enough gas to supply his various gas consuming appliances. The size of the pipes in the supply system must be proportioned to the maximum demand for gas unless increases in supply pressure can be made from time to time as the demand for the gas increases. Those skilled in the art will understand that in economically designed gas distribution systems, unless a regulating device is placed in the supply to each individual customer, only a limited number of consumers relatively short distances from the main supply point can be served without causing excessive pressure variations in the service of the consumer farthest from the main supply point. If however, a regulating device is placed at each consuming point to cut down supply pressure, much greater economies can be made in the cost of the distribution system. For example, if a gas main is large enough to supply the demand with a given pressure loss, of say one inch of water pressure, double this amount of gas will flow over the main if the pressure loss is increased to four inches of water pressure. Thus the gas supply pipe or main investment is cut to one-half for each unit of gas carried. In general, gas carrying capacity varies directly as the square root of the pressure loss, with the investment cost varying inversely as the square root of the pressure loss.

When higher pressures are used for obtaining economy in the investment cost of gas mains, defects which develop in the regulating devices from the passage of time and repeated use sometimes allow the higher distribution pressures to pass into the consumer's appliances to cause unsatisfactory operating conditions. Consequently, I have devised a regulating device which will automatically close off the gas supply if the pressure on the consuming side of the regulating device becomes too high or too low for satisfactory operation and will remain closed until the trouble causing such unsatisfactory pressure has been located and corrected; the regulating device then being capable of a manual reset to assume normal operation.

It is an object of my invention to provide a gas regulating device adapted to be inserted in a gas line and operable automatically to terminate the flow of gas in the line when the gas pressures fall either below a predetermined minimum value or exceed a predetermined maximum value.

It is a further object of my invention to furnish a gas regulating device which will automatically cut off the gas supply if the pressure on the consuming side of the regulating device becomes too high for satisfactory operation.

It is another object of my invention to furnish a regulating device which, having cut off the gas supply due to the excessive pressure on the consuming side of the regulating device, will not permit the passage of the gas supply to the consumer again until the cause of such excessive pressure has been located and rectified.

It is another important object of this invention to furnish a gas regulating device which will automatically cut off the gas supply to the consumer when the service pressure becomes excessively low, which condition is likely to result in the extinguishing of pilot lights for operating burners and the like.

It is a further important object of my invention to provide a gas regulating and automatic shut off device which, once operated to shut off the service gas supply due to low pressures, cannot be reset under the urging of a reinstated normal gas supply, but must be reset manually, thus insuring against resupply to the consumer before gas pilot lights or the like have been reignited, so as to prevent the escape of unburned gas within the household or the areas of consumption.

It is a still further object of my invention to provide means to return normal gas pressure to a system safely without the necessity of first sending the service men to the consuming point to turn off the gas at the service entrance.

It is a still further important object of my invention to provide manual reset means for easily and quickly restoring the regulating device to an operating condition after the fault which caused the interruption of service has been located and rectified.

Still another important object of my invention is to disclose a shut off valve and regulating device which is adapted for easy and quick installation in a variety of positions to accommodate its use to various operating limitations and conditions.

A still further object of my invention is to eliminate the necessity of installing conventional vent piping from the regulating device to the outside of the building.

Another important object of my invention is to provide a gas shut off valve and regulating device which has sufficient operating latitude to accommodate pressure drops accompanying increase in the line load or pressure rises accompanying no load conditions without completely shutting off the gas supply.

Still another important object of my invention is to provide an automatic high and low pressure gas shut off valve and regulating device that is simple in construction and inexpensive in operation and adjustment.

These and further objects and features of my invention will appear from the following detailed description of my invention. Now, in order to acquaint those skilled in the art with the manner of constructing and utilizing an automatic shut-off valve and gas regulating device in keeping with the principles of my invention, I shall describe in connection with the accompanying drawings a preferred embodiment of my invention.

Figure 1:
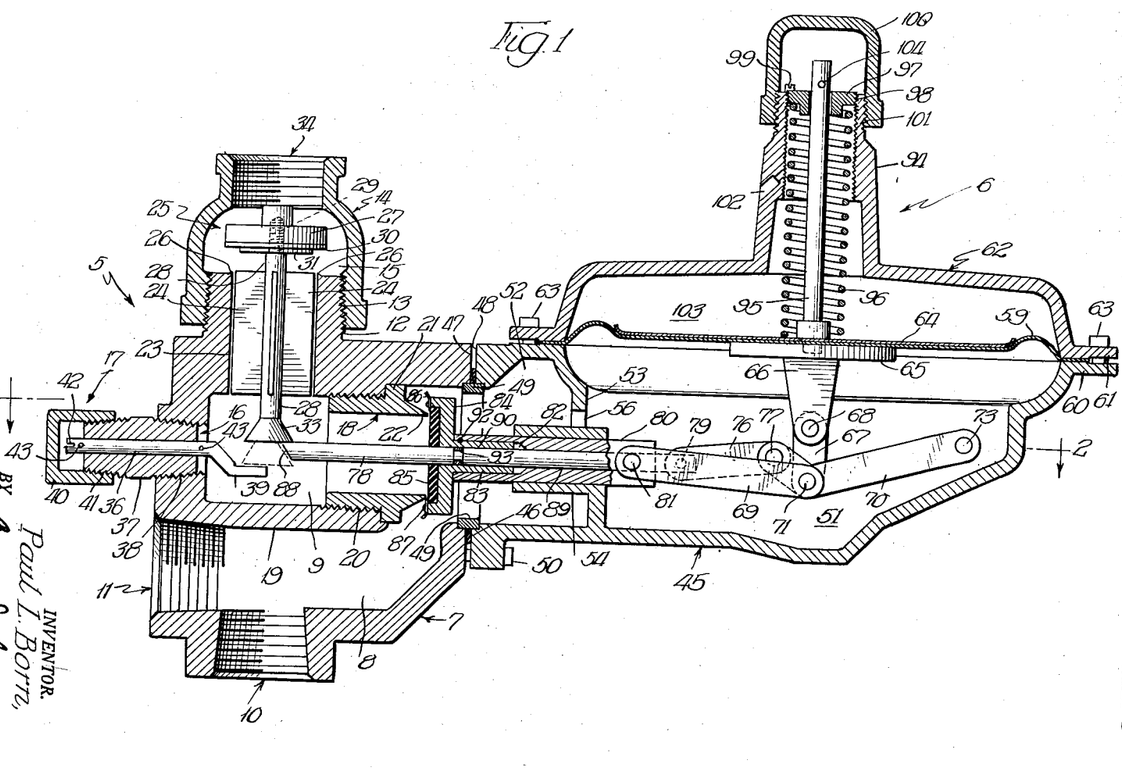
Figure 1 is a front, elevational, vertical cross-section of my invention showing the various operating linkages and parts thereof.
Figure 2:
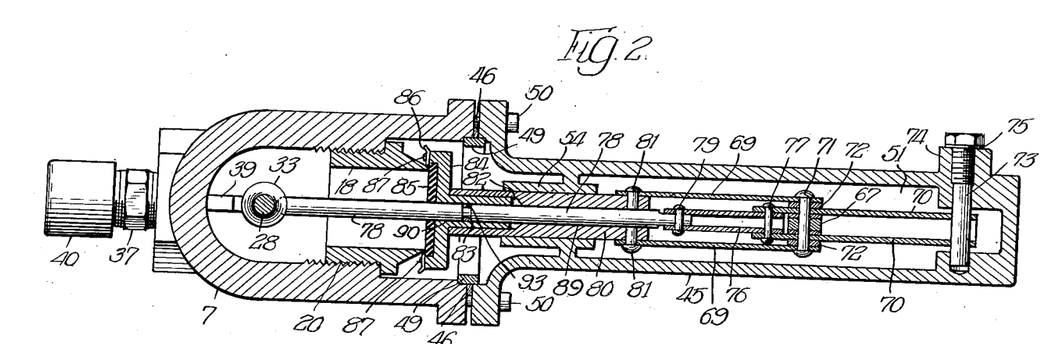
Figure 2 is a top plan cross-sectional view taken substantially along line 2—2 of Figure 1 and looking in the direction of the arrows.

Referring now to Figures 1 and 2 of the drawings, there is shown a combined automatic high and low pressure gas shut-off valve indicated generally by the reference numeral 5 and a gas regulator or governor indicated generally by reference numeral 6. The valve 5 has a housing 7 which is divided into two chambers 8 and 9. The housing 7 is further distinguished by a downwardly extended, internally threaded outlet 10, an immediately adjacent laterally extending outlet 11, and having on its upper side an upwardly projecting, externally threaded boss member 12 provided with a standard 1½ inch pipe thread 13 or the like. A standard pipe fitting 14 is adapted to be threaded around pipe fitting 14 is adapted to be threaded around the projection 12 and contains threads 13 of the projection 12 and contains a hollowed-out interior forming an internal chamber 15. Immediately above outlet 11 and communicating with the internal chamber 9 is a fourth outlet 16 adapted to receive a reset mechanism indicated generally at 17, which will be described later herein. Chambers 8 and 9 are separated by an externally threaded orifice member 18 adapted to be threaded into the right hand end of chamber 9, as viewed in Figure 1; the housing 7 being provided with an internal rib portion 19 provided for mounting orifice 18 and to further separate chambers 8 and 9. The orifice member 18 is provided with external threads 20 for the purpose of mating and mounting that member with the housing 7. Orifice 18 is further distinguished by having an extended annular flange member 21 at the right hand end of the threads 20, as seen in Figure 1, for the purpose of drawing the orifice in abutting engagement against the housing 7 and rib 19. The extreme right hand end of orifice 18 is characterized by a conical-shaped seat 22, the purpose of which will become more apparent hereinafter.

Projection 12 on the housing 7 is provided with a hollowed out cylindrical interior 23 for the reception therein of wing portions 24 of a shut-off unit 25. The upper end of projection 12 adjacent the cylindrical opening 23 thereof terminates in an upward extending cone-shaped seat 26 which is contacted by the shut-off unit 25 when that unit is allowed to drop downwardly through the opening 23.

Shut-off unit 25 is composed of a cylindrical shut-off disc 27 adapted to be mounted to the upper end of a central cylindrical shaft portion 28 integrally associated and formed with the valve wing portions 24; threads 29 being provided for this purpose. A disc of soft valve seat material 30 is held immediately below disc 27 by a washer 31 for contacting the cone-shaped knife-edge 26 when the valve unit 25 is seated therewith. The lower end of the valve unit 25, below wing 24, is distinguished by depending extension of the stem portion 28 which has a frustro-conical-shaped portion 33 thereon. Seating of the shut-off unit 25 by means of engagement of the soft seating material 30 with the knife-edge 26 prevents the flow of gas from chamber 15 into chamber 9. The normal flow of gas is through an opening 34 of the pipe fitting 14 through chamber 15 down past stem member 28 and wings 24 into chamber 9. From chamber 9 the gas passes through orifice 18 into chamber 8 and out through either of the openings 10 or 11 of the housing 7.

The reset member 17 is provided for engaging the lower surface of cone 33 of valve unit 25 in order to return that valve unit from its closed position, as shown in dotted lines of Figure 1, to its full line open position, as shown in that figure. For this purpose, a leg member 36 of the reset unit 17 extends through a heavy pipe nipple 37 threaded in gas tight relationship into the opening 16 of housing 7, by means of threads 38. The coupling nipple 37 is preferably made of non-corroding metal, such as brass, as is also a reset arm 39 formed integrally with the leg member 36 and offset in an angular position at the right hand end thereof, as viewed in Figure 1. A standard pipe cap 40 is screwed onto the left hand end of coupling 37 in gas tight relationship by means of threads 41. The outer left hand end of leg 36 projects into cap 40 and is provided with a slot 42 into which a screw driver may be inserted for rotating the reset leg 36 and arm 39 to raise the shut-off unit 25 from its dotted line position to its full line position, as shown in Figure 1. Pins 43 serve to maintain leg 36 in its mounted position in coupling 37. Preferably, closure cap 40 is applied tightly as by a Stillson wrench, so as to avoid tampering with the valve by unauthorized persons.

Mounted adjacent to and alongside of housing 7 of the shut-off valve 5 is a second hollowed out housing 45 containing mechanism of the gas regulator 6. Attachment between housing 7 and housing 45 is made by a gasket joint having a gasket 46 made in annular form of compressible gasket material and disposed between adjacent endwalls 47 and 48 of the respective housings 7 and 45. An annular guide ring 49 is mounted between the two housings internally of the gasket member 46, as shown in Figure 1, to center gasket 46 in its mounted position between end walls 47 and 48. Screws 50 reach between the adjacent walls 47 and 48 of the two housings and securely hold the two housings together by suitable threads, not shown, to complete the connection between the two adjacent housings 7 and 45. Housing 45 is distinguished by an internal chamber portion indicated generally at 51, which chamber comprises a lower pressure chamber for the operating regulator as will appear presently herein. The left hand side of housing 45, as shown in Figure 1, is provided with another hollowed out chamber portion 52 which communicates with chambers 8 and 9 and is separated from chamber 51 by means of a wall member 53 integrally formed with housing 45 and distinguished by a centrally disposed hollowed out boss member 54 which lies in a horizontal position in coaxial alignment with the longitudinal axis of orifice 18 in its mounted position in housing 7. Immediately above the boss member 54 is a vent hole formed in the separating wall 53 and indicated by numeral 56, for allowing gas to pass from chamber 52 to chamber 51.

Chamber 51 of the housing 45 is covered over at its upper end by a resilient diaphragm member 59 which is held firmly to housing 45 between flange member 60 of the housing 45 and flange member 61 of an upper hollowed out cover 62. Cap screws 63 secure the cover member 62 to the underlying housing 45 in a conventional and well known manner to form a gas-tight joint. Internal diaphragm 59 is clamped between a larger circular upper diaphragm plate 64 and a lower diaphragm plate 65 disposed in concentric relation above and below, respectively, of diaphragm 59 to rigidly secure the central portion of the diaphragm therebetween. The lower diaphragm plate 65 is further distinguished by a centrally disposed, depending stem member 66 which reaches downwardly from the diaphragm plate member 65 into the interior of chamber 51. The lower end of stem 66 is pivotally secured to a straight vertical link member 67 by means of pivot pin 68. Link 67, in turn, connects the stem 66 of the lower diaphragm plate 65 to a toggle arrangement of linkages, all of which are double bar links, comprising a pair of straight bar links 69 and a second pair of offset links 70, all fastened to the lower end of the vertical link 67 by means of a pivot rivet 71. It will be noted that the offset links 70 lie adjacent the straight bar link 67, one on either side thereof, with the pair of straight bar links 69 lying outwardly on either side of the offset links, and separated therefrom by means of spacer members 72. The spaced apart, parallel relation of the pairs of links 70, 70 and 69, 69 is further insured by the provision of lower cross-connecting walls, not shown, formed integrally with the links themselves from a single sheet of metal plate stock or the like; the links 69 and 70 being bent at substantially right angles to their associated walls to form a substantially U-shaped cross section. The right hand ends of the offset links 70 are pivotally mounted on a fulcrum screw 73 which projects transversely through the lower portion of housing 45 and is threaded into a suitable boss extension thereof, indicated by numeral 74. A compressible gasket member 75 is placed between the head of the fulcrum pin 73 and the outer face of the boss member 74 to provide a gas tight seal therewith. The opposite end of the offset links 70 are pivotally connected with a pair of spaced apart, straight bar links 76 by means of pivot pin 77. The straight bar links 76 76, in turn, are pivotally connected at their left hand ends to a horizontally disposed straight cylindrical valve rod 78 by means of pivot pin 79 and their spaced relation maintained by a cross-connecting lower wall, not shown, as with the link pairs 69 and 70. The valve rod 78 is centrally housed, for rectilinear sliding movement, within a cylindrical valve operating member 80 which, in turn, is slidingly journalled within the hollowed-out boss member 54 associated with the left hand wall 53 of housing 45. The straight bar links 69 are pivotally connected at their left hand ends, as shown in Figure 1, to the valve operating member 80 by means of a pair of pivot pins 81. The left hand end of the valve operating member 80 is distinguished by a hollowed-out interior portion 82 adapted to receive a hollow stem portion 83 of a valve unit 84. Valve unit 84 holds a compressible valve seat 85, formed as an annular ring of compressible gasket material, preferably of "Buna N" rubber or the like, secured to the face of the valve unit 84 by an annular disc member 86 which, in turn, is mounted to the face of the valve unit 84 by screws 87. It will be observed that the valve seat 85 is adapted to contact the knife-edge 22 of the orifice member 18 associated with the cut-off valve unit 5. Valve rod 78 is adapted to be received in and extend through a hollowed-out axial interior portion 89 of the operating member 80, the left hand hollowed-out interior portion 82 thereof, through a central axial opening 90 in valve stem 83 and valve face 85 and into chamber 9 of cut-off unit 5 a distance sufficient to allow it to underhang the lower face of the conical stem portion 33 associated with valve unit 25. The valve rod 78 is adapted for sliding movement within the valve operating member 80 and stem 83 of valve unit 84, and is provided with an angular left hand end 88. The length of the rod 78 is such that when it has moved to its extreme left position, as shown in Figure 1, face 88 thereof is in approximate contact, but does not touch the conical surface of the lower conical portion 33 of the valve unit 25, especially when that member is in its lower dotted position, as viewed in Figure 1. The importance of this latter limitation will be readily apparent from the use and operational description to be found later hereinafter. It will be noted that the toggle mechanism comprising links 67, 69, 70 and 76, upon vertical movement of stem 66 in response to vertical movement of the diaphragm 59, causes the valve seat 85 to move laterally toward and away from the knife-edge 22 of the orifice 18, and additionally causes relative sliding movement of the valve rod 78 toward and away from the conical portion 33 of the valve unit 25, the purpose of which will be amplified under the use and operation description later hereinafter. It will also be noted that the valve unit 84 is loosely secured to valve operating member 80 by means of a cotter pin 92, and that a gas-tight seal is provided between the valve rod 78 and the internal face of the stem portion 83 of valve unit 84 by means of a small rubber-like sealing ring 93 adapted to prevent gas flow around the valve rod 78 and through valve unit 84.

The cover 62 is distinguished by a centrally disposed, upwardly projecting, hollowed-out boss member 94, which surrounds and houses a vertical stem member 95, threadingly connected at its lower end to the lower diaphragm plate 65 through suitable apertures (not shown) extending through the upper diaphragm plate and diaphragm. Threading of stem 95 into the lower diaphragm plate serves to compress the two diaphragm retaining plates 64 and 65 together, whereby a gas-tight joint is provided with the diaphragm 59. A spring 96 surrounds stem 95 and is held in compression by plug member 97 screwed into the upper end of the projecting boss 94 by means of internal threads 98, spring 96 serving to bias diaphragm 59 out of its center position of travel illustrated in Figure 1. Plug 97 also receives and surrounds the upper end of stem 95 for guiding the latter in its vertical sliding movement in response to diaphragm fluctuations. A screw 99 locks plug 97 in threads 98, whereby unthreading rotational movement of the plug 97 is prevented until the screw 99 is removed. A cap member 100 threads onto external threads 101 formed at the upper end of the projecting boss 94 to cover over the upper end of stem 95; the cap 100 being provided with a suitable sealing means to prevent unauthorized tampering with the adjustment of spring 96. A vent hole 102 is provided in the projecting boss 94 and is drilled at an upwardly disposed angle therein. The vent hole 102 is provided in order that atmospheric pressure may be maintained above diaphragm 59 in an air chamber 103 formed by the cover 62 and sealed over at the bottom by diaphragm 59. The diameter of hole 102 is relatively smaller at its inner end, so that if diaphragm 59 should break the discharge of gas to the exterior of the regulator unit 6 may be kept at a minimum while valve 25 is closing. The hole 102 is also enlarged at its outer end to decrease the possibility of accidentally closing over the same when the valve is painted or the like. The upper end of stem 95 is provided with a transversely disposed aperture 104 for aiding in the resetting of the regulator and shut-off valve, as will appear presently under the use and operational description herein.

*Use, operation and installation*

Referring now to Figures 1 and 2 of the drawings, I shall set forth the operational functioning of the various elements and parts described heretofore.

The downward thrust of spring 96 and the weight of diaphragm 59, along with the attached toggle links, tend to bias the diaphragm 59 downwardly from the position shown in Figure 1. However, the diaphragm is normally maintained in its Figure 1 position by the pressure of normal gas flow into chamber 8 of valve 5, tending to bias the diaphragm upwardly. Now, if there should be a sudden gas pressure rise in chamber 8, the diaphragm 59, together with link 67 of the toggle mechanism will be forced upwardly. This latter action tends to draw the ends of links 69 and 70, adjacent the pivotal connection 71, upward, which, in turn, effects the movement of valve operating member 80 and valve unit 84 to the left. As the valve seat 85 of the valve unit 84 approaches the knife-edge 22 of orifice 18, less gas is allowed to pass into chamber 8 of the shut-off valve unit 5, which will tend to reduce the pressure in chamber 51 under diaphragm 59, providing gas is continued to be consumed through outlets 10 or 11, whichever one is being used. If no gas is being used, the pressure in chamber 51 continues to rise until movement of diaphragm 59 and links 67, 69 and 70 force valve unit 84 to press the seat 85 thereof firmly against the knife-edge 22 of orifice 18, at which time gas will cease to flow and pressure in chamber 51 will rise no further. When consumption of gas is resumed at outlets 10 or 11, the pressure in chamber 51 will fall, allowing spring 96 to push links 69 and 70 of the toggle mechanism downward to move valve unit 84 away from orifice 18, to provide the necessary supply demanded by the gas consumer. It will thus be seen that the position of diaphragm 59 and, in consequence, valve unit 84 is responsive to pressure in chamber 51 which, in turn, is responsive to the consumption of gas at outlets 10 or 11 in housing 7.

At the time valve seat 85 of the valve 84 is pressed tightly against knife-edge 22 of orifice 18, if for any reason the gas pressure in chamber 51 continues to rise, diaphragm 59 and attached plate 65 draws links 67, 70 and 76, together with adjacent pivotal connections 71 and 77, upward. This latter action effects movement of rod 78 to the right, from its position shown in Figure 1. Upon the pressure of the gas reaching a desired predetermined maximum limit, the diaphragm 59 is forced further upward an amount which causes rod 78 to be pulled from under the valve stem 28 and attached conical seat 33. Valve unit 25 then falls to its dotted Figure 1 position, due to gravity, to allow valve seat 30 to seat with knife-edge 26 formed integrally with the valve projection member 12, thereby to shut off the flow of gas from chamber 15 into chamber 9 of valve 5.

During normal operation, diaphragm 59 and plates 64 and 65 assume a position approximately as shown in Figure 1 of the drawings, allowing valve face 85 of the valve unit 84 to be slightly spaced from the knife-edge of orifice 18. Gas will then flow through inlet 34, chamber 15, chamber 9, through orifice 18 and out of outlet 10 or 11. When the use of gas is being increased at outlet 10 or 11, diaphragm 59 assumes a lower position in order to withdraw valve unit 84 from orifice 18, thereby to allow more gas to pass through orifice 18. Conversely, if the use of gas is decreased at outlet 10 or 11, diaphragm 59 will assume a higher position than that shown in Figure 1, in order to cut down the gas flow. Now, if the supply of gas available at inlet 34 becomes decreased below that required to supply the normal consumption at outlet 10 or 11, pressure in chamber 51 and 52 of the regulator unit 6 would decrease, allowing diaphragm 59 to fall, which causes a depression of links 69 and 70 downwardly. This latter movement of the toggle mechanism withdraws valve operating member 80 to the right, carrying valve unit 84 therewith. This movement will continue to proceed until further opening of the valve unit 84 allows no increase in gas flow to add to the deficiency of supply above noted. Since, presumably, the consumption of the gas at outlet 10 or 11 is still greater than the supply, the pressure in chambers 51 and 52 will continue to fall, allowing diaphragm 59 to depress links 70 and 76 low enough to pull rod 78 further to the right from beneath the cone portion 33. Valve unit 25 will then drop to meet seat 26, thus insuring a shut-off of gas, if and when pressure is returned to inlet 34.

The last action above described might better be illustrated by supposing that some stoppage has occurred in the supply pipe to a group of customers equipped with this device. It will now readily be seen that if the supply is less than the demand of the whole group of customers, all customers would eventually be cut off the line completely by operation of this device. Then, when the stoppage is removed, gas could flow back to all customers in the particular district without any unsatisfactory conditions resulting from the restoration of the gas supply. Proper measures would then have to be taken to restore the gas to each individual customer by resetting my device at the various individual consuming outlets.

The above example of loss of pressure closing this device is but one phase of a general case in which it is adapted to be utilized which may be described as follows:

Whenever the pressures above and below diaphragm 59 are equal, or nearly so, the downward bias created by spring 96 and the weight of the diaphragm and attached parts will always continue to move the toggle system 67, 69, 70 and 76 downward until it rests at the bottom of housing 45. In this position, rod 78 removes support from cone 33 and valve unit 25 falls to seat 26. The loss of pressure mentioned above is a typical example where atmospheric pressure appears both above and below diaphragm 59. Now, should diaphragm 59 crack or break, forming a hole larger than vent hole 102, gas from chamber 51 would be allowed to pass into the space 103 above the diaphragm 59. The pressure above the diaphragm would then equalize sufficiently with the pressure in chamber 51 to allow the downward bias of spring 96 to effect closure of valve 25. Exactly the same closure would take place if a fusible plug, for instance, were installed in connection with diaphragm 59 and adapted to be melted at any desired temperature. A typical installation which would adapt this device for protection against any desired rise in temperature in the vicinity of the valve may be accomplished by axially drilling the lower threaded end of stem member 95 for a distance of one inch or so, and by suitably drilling diaphragm plate 65 and its stem 66 to form a small gas passage communicating with chamber 51. Another hole must then be drilled transversely to the axial hole formed in stem member 95, so that the two holes in stem 95 meet, whereby there is a clear gas passage from chamber 51 to chamber 103. By filling one of these holes in stem 95 with fusible metal in a gas-tight manner, it is possible to provide a practical fusible plug which could be made of any melting material designed to melt at a desired temperature, such as Wood's metal or the like, so that upon equalization of pressures in chambers 103 and 51, through the passage just described, the valve unit 25 would close off the gas supply.

One of the distinctive features about the compound toggle link system I have employed, consisting of member 67, 69, 70 and 76, is that at the time when diaphragm 59 is in its middle travel position of vertical movement, pivots 73, 77 and 79 are in straight line relationship with one another; therefore, rod 78 is pushed to its farthest left position, as viewed in Figure 1, giving full engagement thereof under cone 33. At this time, pivots 71, 73 and 81 are below the straight line position and valve unit 84 does not contact orifice 18. As explained before, when pivot pin 71 rises, valve unit 84 is caused to approach orifice 18 more closely to cut off the gas flow between chambers 8 and 9. As pivots 71, 73 and 81 assume a straight line position, a slight amount of compression is placed on seat material 85, in order to allow diaphragm 59 to continue its upward movement. If this compression of seat material 85 of the valve unit 84 is sufficient to completely stop the flow of gas through orifice 18, no further movement of diaphragm 59 will take place. However, if some foreign material, such as pipe scale or the like, should lodge between knife-edge 22 of orifice 18 and seat material 85, diaphragm 59 will continue to rise due to the leakage of gas thus possible, and pivot 71 will go beyond the straight line between pivots 73 and 81. As a result, the compression of seat material 85 will be reduced until it is eventually absolved. Meanwhile, pivot 77 on the end of link 70 will have risen uniformly with pivot 71, and valve support rod 78 will have started to move to the right by virtue of its connection with pivot 77 through pivot 79 and links 76. At the moment links 69 and 70 have been forced upward an amount sufficient, so that valve 84 is about to leave orifice 18, pivot 77 will rise enough to withdraw rod 78 from below cone 33, allowing valve unit 25 to fall against seat 26, thus interrupting gas flow between chambers 15 and 9. It will further be observed that no free opening between chambers 8 and 9 is allowed on the upper side of the center position of travel of diaphragm 59 until valve unit 25 has dropped to its closed position. The arrangement of links 67, 69, 70 and 76, when valve unit 84 is away from orifice 18 in the regulating position on the lower side of center position of diaphragm travel, allows valve unit 84 to withdraw from orifice 18, so that a full flow of gas is permitted through orifice 18 before rod 78 removes its support from cone 33 for permitting valve unit 25 to fall to seat 26.

It will be observed that valve support rod 78, when in its extreme left position of travel, does not extend to the left far enough to contact stem 28 of valve unit 25 when that valve unit is in its lowest or closed position, as shown in dotted lines in Figure 1. This latter feature is very important because if diaphragm 59 should go to its highest position and trip valve 25 on account of the predetermined high pressure, interruption of the gas flow by valve unit 25 will cut off the gas flow and allow diaphragm 59 to fall to its lowest position. In such an happenstance, as diaphragm 59 passes its center position of travel, rod 78 would assume its extreme left position of travel. It is obvious that if rod 78 were long enough, it would then contact stem 28 of valve unit 25, which action would be sufficient to tip the valve 25 enough to cause leakage at seat 26. Such an eventuality must be guarded against and is not desirable; therefore, the length of rod in its extreme left position is so designed and proportioned that it does not contact stem 28 when valve 25 is in its lowest position. At the same time, it is sufficiently long to give adequate support to cone 33 when valve 25 is in its open or upper position and diaphragm 59 is in its mid position of travel.

It will be noted additionally that the compression of seat material 85 of valve unit 84, when contacting edge 22 of orifice 18 during the period when pivots 71, 73 and 81 are in the same straight line, is also critical and should be limited to about $\frac{1}{32}$ of an inch. It is also to be noted that it is essential in constructing this valve to machine all parts exactly and precisely, in order to preserve the functions above described. Preferably, the seat material 85 should be of "Buna N" rubber or like resilient material having resistance to action of hydrocarbons contained in household gas.

Figures 3, 4:
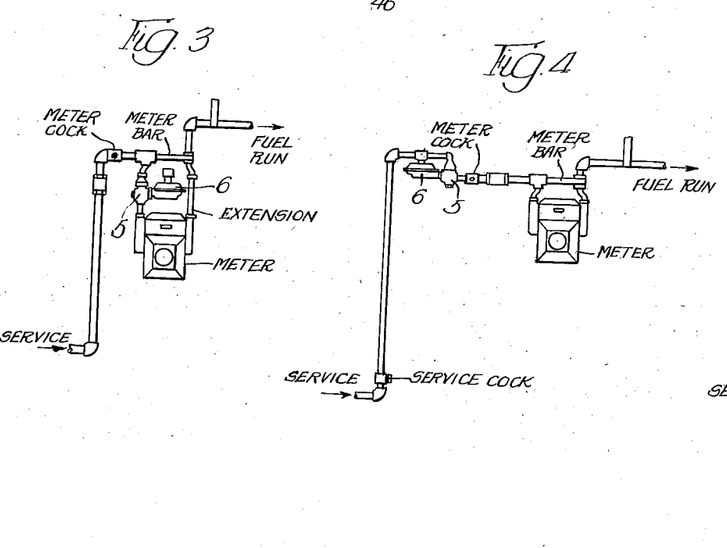
Figure 3 is a schematic view of a typical installation in which the automatic shut-off and regulating device of my invention is adapted for use.
Figure 4 is another schematic view similar to Figure 3 showing an alternate installation of my invention.
Figure 5:
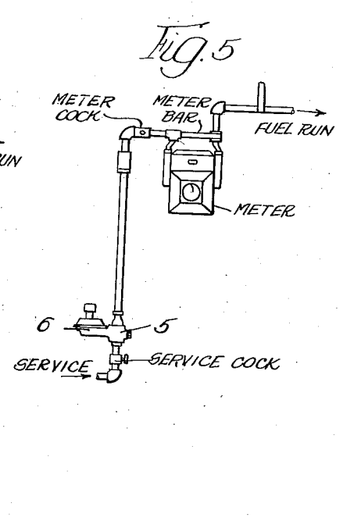
Figure 5 is another schematic view similar to Figures 3 and 4 showing a third alternate installation of my automatic shut-off and gas regulating device.

In order to more fully understand the adaptability and manner of installing my device, it should be recognized that the shut-off valve unit 5 has been attached to the regulator valve case 45 by means of a symmetrical flanged joint, whereby the gas may enter at the top and issue at the bottom of the valve unit 5 or vice versa. When shut-off valve 5 is reversed, so that opening 34 is on the bottom and opening 10 is on the top, housing 14 should be modified, so that a spring may exert an upward thrust on valve 25 equal to twice the combined weight of valve unit 25 and the associated stem parts 24, 28 and 33. My shut-off valve and regulating device may be installed economically and conveniently between the gas main and the conventional gas meter commonly employed in home installation. As shown in the installation illustrated in Figure 3 of the drawings, with my regulating device installed between the meter bar and the meter, there is a pipe extension of equal length between the meter bar and the meter on the opposite side of the meter from the regulating device. It will likewise be noted from Figure 3 that the regulating device is installed between the meter cock and the meter. In other cases my regulating device may be installed at the inlet to the meter bar utilizing outlet 11, as illustrated in Figure 4 of the drawings. To aid in further understanding my invention, I shall now describe one method of resetting the device after valve unit 25 has fallen to seat 26 to cut off the flow of incoming gas. For this purpose, the illustration, as shown in Figure 5, may be considered as typical. It is first necessary to close the service cock, then close off all appliance valves or other points of usage. Caps 100 and 40 are then removed and a screw driver inserted in slot 42, revealed by removal of cap 40, so that the reset members 39 and 36 may be turned one-half turn in either direction where the reset device 17 should be held momentarily. Valve stem 95 is then raised until the hole 104 is exposed above the inner edge of the projection 94 of the cover member 62. The reset members 36 and 39 may then be released and a piece of wire or a small nail inserted in hole 104 to hold stem member 95 in its middle position. After making sure that the reset members 39 and 36 have been turned one-half turn to their original positions, cap 40 is replaced. Next, the service cock is opened to allow gas to flow through inlet 34 of the shut-off valve 5 again, and the wire or nail removed from hole 104 in the stem member 96. At this stage it is advisable to relight all gas pilots and to test the appliances being supplied on the service side of the regulator. After making sure that everything is in proper working order, cap 100 may be replaced on projection 94 and resealed.

Thus, it may be seen that I have provided a new and useful gas shut-off valve and regulating device combined in a single unit which is readily adapted for installation in various positions and insures a safe cut-off of the incoming gas supply in instances where the supply pressure is below a minimum or exceeds a safe maximum upper limit, thereby to safely guard against undesirable operating conditions on the consuming side of the gas meter or the like. While I have herein shown and described one form in which the various features and operating mechanisms of my device may appear, it readily will be understood that numerous changes, modifications and substitutions of equivalents may be utilized without departing from the spirit and scope hereof and, therefore, I do not wish to be limited to the specific embodiment herein illustrated except as may appear in the following appended claims.

I claim:

1. A valve construction, comprising a hollow housing having a gas inlet and outlet, a valve seat in said housing, a valve mounted for sliding movement toward and away from said valve seat to engage and disengage the same, a rod means disposed in said housing, extending beneath said valve to support the same and mounted for transverse movement relative to said valve for disengagement therefrom, a second valve means associated with and concentrically surrounding said rod, said second valve means being independently movable relative to said first mentioned valve along an axis common with said rod to meter and interrupt the passage of said gas through housing from said inlet to said outlet with movement of said second valve to a predetermined position causing disengagement of said rod and said first mentioned valve to close the latter.

2. A valve construction, comprising a hollow housing having a gas inlet and outlet, a valve seat in said housing, adjacent said inlet; a valve mounted for sliding movement toward and away from said valve seat to engage and disengage the same, a rod means disposed in said housing and mounted for transverse movement relative to said valve, said valve being adapted to rest on one end of said rod whereby said valve is normally held open; a second valve means slidingly associated with and concentrically surrounding said rod, said second valve means being adapted for transverse movement relative to said first mentioned valve along an axis common with said rod, and pressure responsive means having connection with said rod for effecting movement of the latter out of engagement with said first mentioned valve thereby to allow movement of said first mentioned valve onto said seat to interrupt the flow of gas from said inlet to said outlet.

3. A valve construction, comprising a hollow housing having a gas inlet and outlet, a valve seat in said housing, adjacent said inlet; a valve mounted for sliding movement toward and away from said valve seat to engage and disengage the same, a rod means disposed in said housing and mounted for transverse movement relative to said valve, said valve being adapted to rest on one end of said rod whereby said valve is normally held open; a second valve means associated with and concentrically surrounding said rod, said second valve means being adapted for transverse movement relative to said first mentioned valve along an axis common with said rod; pressure responsive means having connection with said rod for effecting movement of the latter out of engagement with said first mentioned valve thereby to allow movement of said first mentioned valve onto said seat to interrupt the flow of gas from said inlet to said outlet, and additional connective means between said pressure responsive means and said second valve for transversely actuating said second valve thereby to regulate the flow of gas from said inlet to said outlet.

4. A valve construction, comprising a hollow housing having a gas inlet and a plurality of gas outlets, a valve seat in said housing, adjacent said inlet; a valve mounted for vertical sliding movement toward and away from said valve seat to engage and disengage the same, a rod means disposed in said housing and mounted for transverse horizontal movement relative to said valve, said valve being adapted to rest on one end of said rod whereby said valve is normally held open; a second valve means associated with and concentrically surrounding said rod, but slidingly movable relative thereto; said second valve means being adapted for horizontal movement relative to said first mentioned valve along an axis common with said rod, and vertically movable, pressure responsive means having connection with said rod for effecting horizontal movement of the latter out of engagement with said first mentioned valve thereby to allow vertical movement of said first mentioned valve in response to the force of gravity thereon whereby said first mentioned valve may seat to interrupt the gas flow from said inlet to said outlets, and connective means between said pressure responsive means and said second valve for horizontally actuating said second valve along said rod thereby to regulate the flow of gas from said inlet to said outlet.

5. A valve construction as described, comprising in combination, a hollow housing having an upper service inlet and a pair of lower consumption outlets, an inlet valve seat adjacent said inlet, an inlet valve adapted for movement toward and away from said inlet valve seat, a lower stem portion integrally formed with said inlet valve, a regulating valve orifice in said housing intermediate said inlet and said outlets, a regulating valve mounted for sliding movement toward and away from said orifice, a rod member axially mounted in said regulating valve for transverse sliding movement relative to said inlet valve stem along a path coinciding with the central longitudinal axis of said regulating valve, said stem portion being adapted to rest on one end of said rod normally to dispose said inlet valve in its open position; and said regulating valve being slidably movable relative to said rod along a common axis therewith periodically to close over said orifice and shut off the flow of gas from said service inlet to said consuming outlets.

6. A valve construction as described, comprising in combination, a hollow housing having an upper service inlet and a pair of lower consumption outlets, an inlet valve seat adjacent said inlet, a valve adapted for movement toward and away from said inlet valve seat, a lower stem portion integrally formed with said inlet valve, a regulating valve orifice in said housing intermediate said inlet and outlets, a regulating valve mounted for sliding movement toward and away from said orifice, a rod member axially mounted in said regulating valve for transverse sliding movement relative to said inlet valve stem, said stem portion being adapted to rest on one end of said rod normally to dispose said inlet valve in its open position; said regulating valve being slidably movable relative to said rod, along a common axis therewith, periodically to close over said orifice and shut off the flow of gas from said service inlet to said consuming outlet, and pressure responsive means having connection with said rod for effecting movement of said rod out of engagement with said stem to permit said inlet valve to close thereby to interrupt the flow of gas from said inlet to said outlets.

7. A valve construction as described, comprising in combination, a hollow housing having an upper service inlet and a pair of lower consumption outlets, the latter of which are adapted for simultaneous or independent use, an inlet valve seat adjacent said inlet, a valve adapted for movement toward and away from said inlet valve seat, a lower stem portion integrally formed with said inlet valve, a regulating valve orifice in said housing intermediate said inlet and outlets, a regulating valve mounted for sliding movement toward and away from said orifice, a rod member axially mounted in said regulating valve for transverse sliding movement relative to said inlet valve stem, said stem portion being adapted to rest on one end of said rod normally to dispose said inlet valve in its open position; said regulating valve being slidably movable relative to said rod along a common axis therewith toward and away from said orifice to regulate and interrupt the flow of gas from said service inlet to said consuming outlets; and pressure responsive means having connection with said rod and said regulating valve for effecting movement of said rod out of engagement with said stem to permit said inlet valve to close and additionally to permit said regulating valve to seat with said orifice and move toward and away from said orifice thereby to interrupt or meter said gas flow.

8. A valve construction as described, comprising in combination, a hollow housing member having an upper service inlet and a pair of lower consumption outlets, an inlet valve seat adjacent said inlet, a valve adapted for movement toward and away from said inlet valve seat, a lower stem portion integrally formed with said inlet valve, a regulating valve orifice in said housing intermediate said inlet and said outlets, a regulating valve mounted for sliding movement toward and away from said orifice, a rod member axially mounted in said regulating valve for transverse sliding movement therethrough relative to said inlet valve stem, said stem portion being adapted to rest on one end of said rod normally to dispose said inlet valve in its open position; said regulating valve being slidably movable relative to said rod along a common axis therewith periodically to close over said orifice and interrupt the flow of said gas from said service inlet to said consuming outlets; pressure responsive means having independent connection with said rod and said regulating valve for effecting movement of said rod out of engagement with said stem to permit said inlet valve to close and additionally to permit said regulating valve to seat with and move relative to said orifice thereby to interrupt or meter said gas flow, and a reset member extending through said housing in axial alignment with said rod and said orifice, having an offset arm at its lower end adapted normally to lie beneath said stem and rod, said reset member being rotatable so that said arm may be moved into engagement with said stem to open said inlet valve after said rod has allowed said inlet valve to close.

9. In a gas regulating and shut-off device of the class described, a hollow valve housing having an inlet chamber, an intermediate chamber and an outlet chamber; an inlet valve disposed between said inlet and intermediate chambers, a depending stem portion associated with said valve and reaching between said inlet and intermediate chambers, an orifice between said intermediate chamber and said outlet chamber, a knife-edge valve seat at one end of said orifice, a regulating valve adapted to seat against said knife-edge seat and slidingly movable relative thereto, a rod member slidingly journalled through said regulating valve and movable along the longitudinal axis thereof, the inner end of said rod being adapted to contact said inlet valve stem thereby to hold said inlet valve in an open position, a pressure regulator housing adjacent said valve housing, having upper and lower chambers therein; said rod and said regulating valve being slidingly movable between said valve's intermediate chamber and said regulator's lower chamber, a flexible diaphragm between said regulator's upper and lower chambers, toggle linkage means between said diaphragm and said rod for slidingly moving said rod in response to fluctuations of said diaphragm, and additional toggle linkage means between said diaphragm and said regulating valve for similarly moving said regulating valve in response to movement of said diaphragm.

10. In a gas regulating and shut-off device of the class described, a hollow valve housing having an inlet chamber, an intermediate chamber and an outlet chamber; an inlet valve disposed between said inlet and intermediate chambers, a depending stem portion associated with said inlet valve and reaching between said inlet and intermediate chambers, an orifice between said intermediate chamber and said outlet chamber, a knife-edge valve seat at one end of said orifice, a regulating valve adapted to seat against said knife-edge seat and slidingly movable relative thereto in a direction transverse to the direction of movement of said inlet valve, a rod member slidingly journalled in said regulating valve and movable along the longitudinal axis thereof, the inner end of said rod being adapted to contact said inlet stem thereby normally to hold said inlet valve in an open position; a pressure regulator housing adjacent said valve housing, having upper and lower chambers therein; said rod and said regulating valve being slidingly movable between said valve's intermediate chamber and said regulator's lower chamber, a flexible diaphragm between said regulator's upper and lower chambers, toggle linkage means connecting said diaphragm and said rod for moving said rod in a direction transverse to the movement of said diaphragm thereby to move said rod relative to said stem, sufficient upward or downward movement of said diaphragm causing said rod to withdraw its support from said stem whereby said inlet valve is permitted to close; additional toggle linkage means connecting said diaphragm with said regulating valve whereby said regulating valve moves toward and away from said orifice in response to movement of said diaphragm, sufficient movement thereof causing said regulating valve to close over said orifice.

11. In a gas regulating and shut-off device of the class described, a hollow valve housing having an upper inlet chamber, an intermediate chamber and a lower outlet chamber; an inlet valve disposed between said inlet and intermediate chambers, a depending stem portion associated with said inlet valve and reaching between said inlet and intermediate chambers, an orifice between said intermediate and said outlet chambers, a valve seat at one end of said orifice, a regulating valve adapted to seat against said valve seat and slidingly movable relative thereto, a rod member slidingly journalled in said regulating valve for sliding relative movement therethrough along the longitudinal axis thereof, the inner end of said rod being adapted to contact said inlet valve stem thereby to hold said inlet valve in an open position; a pressure regulator housing adjacent said valve housing having a gas-tight connection therewith and containing a lower gas-tight chamber which communicates with said outlet chamber, a movable diaphragm covering over said regulator housing, a hollow cover member covering over said diaphragm and having gas-tight connection with said regulator housing to form an air chamber between said cover and said diaphragm, said air chamber communicating with the atmosphere; a central shaft member journalled in said cover and adapted for sliding movement transversely of said diaphragm, said shaft member having rigid connection with the center of said diaphragm thereby to move responsively therewith; a compressible spring surrounding said shaft and adapted to bias said diaphragm's center point downwardly, toggle means within said regulator housing having pivotal connection with said diaphragm's center point and movable in response to fluctuations thereof as induced by gas pressures in said regulator's lower chamber, connective means between said toggle means and said rod for moving said rod transversely of said inlet valve stem in response to fluctuations of said diaphragm thereby to permit said inlet valve to close, additional connective means between said toggle means and said regulating valve for moving said regulating valve toward and away from said orifice whereby the gas flow through said orifice may be regulated and said orifice may be closed over in response to predetermined gas pressures in said regulator's lower chamber.

12. The valve construction as set forth in claim 11 wherein a reset means is associated with said inlet valve for manually returning said valve to its open position after the closing of the same.

13. The valve construction as set forth in claim 12 wherein additional reset means is provided for manually returning said diaphragm to its center position of travel, for opening said regulating valve and holding said inlet valve in its open position after the latter has closed in response to extreme movements of said diaphragm from its center position of travel as induced by gas pressures in said regulator's lower chamber.

14. In a gas regulating shut-off device of the class described, a hollow valve housing having an upper inlet chamber, an intermediate chamber and an outlet chamber; an inlet valve disposed between said inlet and intermediate chambers, a depending stem portion associated with said inlet valve and reaching between said inlet and intermediate chambers, an orifice between said intermediate and said outlet chambers, a valve seat at one end of said orifice, a regulating valve adapted to seat against said valve seat and additionally adapted for sliding movement relative thereto in a direction transverse to the direction of movement of said inlet valve, a rod member slidingly journalled in said regulating valve and movable therethrough along the longitudinal axis thereof, the inner end of said rod being adapted to support said inlet valve stem thereby normally to hold said valve in an open position; a pressure regulator adjacent said valve housing having upper and lower chambers therein, said rod and said regulating valve being slidingly movable between said valve's intermediate chamber and said regulator's lower chamber, a flexible diaphragm between said regulator's upper and lower chambers, spring means above said diaphragm tending to bias said diaphragm out of its normal center position of travel, a toggle linkage means connecting said diaphragm and said rod whereby said rod slidingly may be moved transversely of said inlet valve stem in response to movement of said diaphragm from its center position of travel; movement of said diaphragm from its center position of travel being induced in one direction by said spring means and in an opposite direction by gas pressures within said regulator's lower chamber; additional toggle linkage means connecting said diaphragm with said regulating valve for moving the same toward and away from said orifice in response to movement of said diaphragm whereby upon the occurrence of predetermined excessive high or low gas pressures in said regulator's lower chamber, movement of said diaphragm in response thereto will cause said rod to be moved to a non-supporting position away from said inlet valve stem thereby to close said inlet valve and interrupt the flow of gas to said outlet chamber, and whereby additionally, upon the presence of intermediate predetermined pressures within said regulator's lower chamber, responsive movement thereto of said diaphragm will cause said regulating valve to close over said orifice thereby to interrupt the flow of gas to said regulator's lower chamber and said valve housing's outlet chamber.

15. A valve construction, comprising a hollow housing having a gas inlet and outlet, a valve seat in said housing, adjacent said inlet; a valve mounted for sliding movement toward and away from said valve seat to engage and disengage the same, a rod means disposed in said housing and mounted for transverse sliding movement relative to said valve, said valve being adapted to rest on one end of said rod whereby said valve normally is held open; a second valve means slidingly associated with and centrally journalling said rod for sliding axial movement therethrough, said second valve means being adapted for transverse sliding movement relative to said first-mentioned valve along an axis common with said rod and additionally adapted for sliding movement relative to said rod, pressure responsive means having connection with said rod for effecting sliding movement of the latter out of engagement with said first-mentioned valve thereby to trip said first-mentioned valve to interrupt the flow of gas from said inlet to said outlet; said second valve being adapted to stop all gas flow to said outlet while said first-mentioned valve is tripping closed due to the presence of excessive high pressure and additionally adapted to allow full gas flow to said outlet when said first-mentioned valve is about to trip closed due to excessive low pressures.

16. In a gas regulating and shut-off device of the class described, a hollow valve housing having an upper inlet chamber, an intermediate chamber and a lower outlet chamber; an inlet valve disposed between said inlet and intermediate chambers, a depending stem portion associated with said inlet valve and reaching between said inlet and intermediate chambers, an orifice between said intermediate and said outlet chambers, a valve seat at one end of said orifice, regulating valve means adapted to seat against said valve seat and slidingly movable relative thereto, a rod member slidingly journalled in said regulating valve for sliding relative movement therethrough along the longitudinal axis thereof, the inner end of said rod being adapted to contact the lower end of said inlet valve stem thereby to hold said inlet valve in an open position; a pressure regulator housing adjacent said valve housing having gas-tight connection therewith and containing a lower gas-tight chamber which communicates with said outlet chamber, a movable diaphragm covering over said regulator housing, a hollow cover member covering over said diaphragm and having gas-tight connection with said regulator housing to form an air chamber between said cover and said diaphragm, said air chamber communicating with the atmosphere; a central shaft member mounted in said cover and adapted for sliding movement transversely of said diaphragm, said shaft member having rigid connection with the center of said diaphragm thereby to move responsively therewith; a compressible spring surrounding said shaft and adapted to bias said diaphragm center point downwardly, toggle means within said regulator gas chamber having pivotal connection with said diaphragm center point and movable in response to fluctuations thereof as induced by gas pressures in said regulator's lower chamber, connective means joining said toggle means and said rod for moving the latter transversely of said inlet valve stem in response to pressure-induced fluctuations of said diaphragm, said rod being moved out of engagement with said stem to permit said inlet valve to close upon the occurrence of excessive high or low gas pressures in said lower gas-tight chamber; an additional connective means joining said toggle means with said regulator valve whereby the latter is adapted to be moved toward and away from said orifice, independently of said rod's movement, to regulate the flow of gas therethrough whereby said regulator valve is adapted to stop all gas flow through said orifice as said inlet valve is closing due to the presence of excessive high pressures below said diaphragm and additionally adapted to permit full flow of gas through said orifice just prior to the closing of said inlet valve, due to excessive low gas pressures below said diaphragm.

PAUL L. BORN.

REFERENCES CITED

The following references are of record in the file of this patent:

UNITED STATES PATENTS

| Number    | Name     | Date          |
|-----------|----------|---------------|
| 1,264,006 | Buckman  | Apr. 23, 1918 |
| 2,327,055 | McMahon  | Aug. 17, 1943 |
| 2,351,047 | Hughes   | June 13, 1944 |

FOREIGN PATENTS

| Number  | Country       | Date          |
|---------|---------------|---------------|
| 383,446 | Great Britain | Nov. 17, 1932 |